United States Patent [19]
Nordstrom et al.

[11] Patent Number: 6,085,277
[45] Date of Patent: Jul. 4, 2000

[54] INTERRUPT AND MESSAGE BATCHING APPARATUS AND METHOD

[75] Inventors: Gregory Michael Nordstrom, Oronoco; Shawn Michael Lambeth, Pine Island; Paul Edward Movall, Rochester; Daniel Frank Moertl, Rochester; Charles Scott Graham, Rochester; William Joseph Armstrong, Kasson; Thomas Rembert Sand, Rochester, all of Minn.

[73] Assignee: International Business Machines Corporation, Armonk, N.Y.

[21] Appl. No.: 08/950,755

[22] Filed: Oct. 15, 1997

[51] Int. Cl.[7] .................................................. G06F 13/00
[52] U.S. Cl. ............................................. 710/263; 710/62
[58] Field of Search ................................... 395/736, 821; 710/46–48, 54–61, 260–266

[56] References Cited

U.S. PATENT DOCUMENTS

| | | | |
|---|---|---|---|
| 4,783,730 | 11/1988 | Fisher | 710/5 |
| 5,471,618 | 11/1995 | Isfed | 710/19 |
| 5,507,032 | 4/1996 | Kimura | 395/826 |
| 5,513,368 | 4/1996 | Garcia, Jr. et al. | 710/22 |
| 5,535,420 | 7/1996 | Kardach et al. | 710/48 |
| 5,708,814 | 1/1998 | Short et al. | 395/733 |
| 5,761,427 | 6/1998 | Shah et al. | |
| 5,805,929 | 9/1998 | Connolly et al. | 70/49 |
| 5,875,343 | 2/1999 | Binford et al. | 395/736 |

OTHER PUBLICATIONS

*Inside the AS/400,* Chapter 10, pp. 253–275, by Frank Soltis, Duke Press, Loveland, Colorado, 1996.
"PCI Local Bus Specification," Product Version, Revision 2.1, Jun. 1, 1995, pp. 1–282.

*Primary Examiner*—Christopher B. Shin
*Attorney, Agent, or Firm*—Birch, Stewart, Kolasch & Birch

[57] ABSTRACT

An interrupt and message batching apparatus and method reduces the number and frequency of processor interrupts and resulting context switches by grouping I/O completion events together with a single processor interrupt in a manner that balances I/O operation latency requirements with processor utilization requirements to optimize overall computer system performance. The invention sends a message from a processor complex to an I/O adapter on an I/O bus commanding an I/O device connected to the I/O adapter to perform a function. Upon completion of the commanded function, the message processor in the I/O adapter generates a message and sends it to the processor complex on the I/O bus. The message is enqueued in the message queue of the memory, a message count is updated, and processor complex interrupt is signalled if and when the message count exceeds a message pacing count. A signalling timer may also be programmed with a fast response time value if the message has a relatively high latency or with a slow response time value if the message has a relatively low latency. The signalling timer is started when the message is enqueued and the processor complex interrupt is then signalled when the message count exceeds the message pacing count or when the signalling timer has elapsed.

39 Claims, 5 Drawing Sheets

INTERRUPT AND MESSAGE BATCHING APPARATUS AND METHOD

CROSS REFERENCE TO RELATED APPLICATION

The present application is related to the following IBM patent applications: U.S. patent application Ser. No. 08/951,157 filed on Oct. 15, 1997 entitled "PCI Interrupts" and U.S. patent Ser. No. 08/950,593 filed on Oct. 15, 1997 entitled "Message Transport Mechanisms and Methods".

TECHNICAL FIELD OF THE INVENTION

This invention relates to a method and apparatus for managing a queue of messages. More particularly, this invention relates to a managed queue of messages that accounts for device latencies when generating a queue ready indication such as an interrupt signal.

BACKGROUND OF THE INVENTION

Computer Input/Output (I/O) protocols govern communications between computer operating system programs and computer I/O devices, such as I/O devices that provide disk storage, communications or network capabilities. Conventionally, these I/O protocols are based upon command and response messages that are exchanged with an 1/O bus that interconnects the computer central processor and memory to I/O adapters or I/O processors (these latter being a form of I/O adapter that is distinguished as having more complex functions, usually in support of the operating system programs, than the general class of "I/O adapter").

In such conventional I/O protocols, operating system device driver programs create command messages which are then transmitted across an I/O bus to the I/O adapter. The adapter interprets the command and performs the requested operation. Usually, this operation includes the transfer of data between an I/O device and the computer memory across the I/O bus. Such data transfers are typically performed by using known direct memory access (DMA) mechanisms that are part of the I/O bus functions.

When the I/O adapter has completed the requested operation, it creates a response message which is then transmitted back to the computer memory where the operating system and device driver programs can then interpret that response and conclude the overall I/O operation.

The execution of I/O commands by an I/O adapter typically requires a time duration that is many thousands, or even millions, of central processor instruction cycles. Thus, while the I/O adapter is performing a command, the device driver and computer operating system normally perform other work and are not dedicated strictly to waiting for the I/O adapter to complete the command and forward the response message. Rather, the typical device driver and operating system rely upon an asynchronous event indication, such as a processor interrupt, to signal that the I/O adapter has completed the command and that the response message is available for the operating system and device driver to interpret.

The relative timing and frequency of such processor interrupts signalling that an I/O command has been completed have significant effects on the overall utilization of the central processor, utilization of the I/O device and its data throughput capabilities, and overall system performance. Such utilization is also affected by I/O command latency, or the duration of an I/O operation as seen by the programs that depend upon that I/O operation to complete their functions.

For example, in a large high performance processor system, the latency for an I/O memory read across a PCI (Peripheral Component Interconnect) standard bus may require many, many processor cycles which seriously degrades execution speed of a program depending upon that I/O memory read.

More particularly, a high performance processor attempting to do a single memory read of one word (4 bytes) of data from a PCI device may experience a latency to complete that memory read of about 80 to 200 processor cycles. Servicing an interrupt typically requires multiple loads across the PCI bus resulting in latencies approaching a thousand processor cycles.

The PCI local bus specification utilizes a mechanism that potentially alleviates some of these inefficiencies due to I/O latencies. This mechanism sets target latencies which are not to be exceeded by the master (eg. host system), the bus arbitrator or the target (eg. I/O device) to help limit the time in which the system must wait for responses.

However, in practice, the PCI bus has a minimum latency based on its cycle time which is currently on the order of 33 to 66 MHz, so there are still guaranteed minimum latencies of several hundred nanoseconds. Furthermore, the maximum, target latencies that the PCI standard would expect are typically on the order of several hundred to several thousand nanoseconds.

Potentially, for a slow I/O device that maximum latency could even realistically be upwards of a millisecond or several milliseconds. The consequence to a high performance processor running with, for example, a 7 nanosecond cycle time, is that, even at minimum expected latencies on a PCI bus, the processor is facing several hundred to several thousand cycles of time delay.

To optimize central processor utilization, conventional systems typically attempt to minimize the number of processor instruction cycles required to recognize the completion event and communicate this event to the I/O device driver. To optimize I/O device throughput, conventional systems also minimize the time between the completion of one I/O command and the start of the next I/O command. To optimize overall system performance, in relation to programs that require I/O, conventional systems also minimize the latency of an I/O operation, as measured from the time that the command is created until the time that the response has been interpreted and the results are available to the program that caused or required the I/O (such as, for example, an "OPEN FILE" function that requires a disk read operation to get information about the location of the requested file).

To accomplish these objectives, conventional I/O device protocols also employ both command and response queues located in the computer main memory, I/O adapter memory or registers, or a combination of both. Command queues enable the device driver to create new commands while the I/O adapter executes one such command. Response queues enable the device adapter to signal the completion of previous commands and proceed to new commands without waiting for the device driver or operating system to recognize and interpret the completion of these previous commands.

Similarly, computer systems generally use a processor interrupt mechanism which the I/O adapter uses to signal completion of a command and notify the processor that a response message has been placed on the response queue. The interrupt mechanism provides a signal line from the I/O adapter to the processor that, when asserted, asynchronously interrupts the central processor and switches processor execution from its current program to an operating system or device driver program designed to interpret the interrupt event.

While this interrupt mechanism can help optimize the latency associated with the completion of an I/O command and interpretation of the response message, switching the processor execution from its current program to an interrupt program requires a processor "context switch" that is an extremely time-expensive process requiring many instruction cycles. This context switch saves the current program's critical information such as selected processor registers and state information and loads the interrupt program's critical information.

When the device driver or operating system interrupt program completes its immediate work and is ready for the processor to resume the interrupted program, there is a second context switch to restore the critical information of the interrupted program which allows the processor to resume the interrupted program.

Each context switch is expensive because it consumes valuable processor time. It is important to note that a context switch has an associated latency that is at least an order of magnitude greater than the latency associated with a PCI load. Because conventional systems interrupt the processor every time an I/O event has completed, context switches are relatively frequent and greatly contribute to processor inefficiency.

There are two fundamental trends in computer science and the industry today that exacerbate the problems in conventional I/O systems. The first trend is that processors are getting very fast very quickly at a rate that greatly eclipses the pace at which I/O bus latencies are decreasing. As a trend, what is occurring in the industry is that the latency mismatch between PCI buses and high performance processors is going to grow rather than stay the same or decrease. This will degrade the relative performance of processors using conventional I/O systems such as the PCI standard because of the resulting frequent and time-expensive interrupts.

The second trend in computer science which magnifies the disadvantages of conventional I/O systems is network computing where a large number of relatively slow and inexpensive computers are connected to a shared, high-speed I/O device such as a mass storage device or communication link via an I/O processor. In such systems, the bottleneck often occurs at the shared I/O processor which must handle frequent interrupts from the networked computers.

OBJECTS AND SUMMARY OF THE INVENTION

An object of the invention is to address the disadvantages of conventional I/O systems.

Another object of the invention is to optimize overall processor utilization and computer system performance.

Still another object of the invention is to reduce the number and frequency of processor interrupts and resulting context switches.

To achieve these objects, the invention "amortizes" the performance cost of interrupt mechanisms by grouping I/O completion events together with a single processor interrupt.

The present invention further achieves these objects by utilizing a mechanism in combination with a computer operating system and an I/O adapter, to determine when to signal a processor interrupt regarding available response messages. In other words, the invention effectively groups or "batches" I/O completion events in a manner that balances I/O operation latency requirements with processor utilization requirements to optimize overall computer system performance.

To further achieve the objects of the invention, a method is disclosed which manages a message queue in a computer system having an input/output I/O bus connecting an I/O adapter, a memory and a processor complex, including the steps of: providing a message queue in the memory, sending a message from the processor complex to the I/O adapter on the I/O bus commanding an I/O device connected to the I/O adapter to perform a function. In response, the I/O adapter generates a second message upon completion of the commanded function and sends the second message from the I/O adapter to the processor complex on the I/O bus. The second message is enqueued in a message queue of the memory and message count is updated. When the message count exceeds a message pacing count, an interrupt signal is generated.

Further achieving the objects of the invention are method steps including programming a signalling timer with a fast signal time value if the I/O device has a relatively short latency period or with a slow signal time value if the I/O device has a relatively long latency period. The method further includes starting the signalling timer when a message is enqueued by said enqueing step, wherein the signalling step signals a processor complex interrupt when the message count exceeds the message pacing count or when the signalling timer has elapsed.

To still further achieve the objects of the invention, a system is disclosed for handling I/O messages transmitted over an I/O bus, including a processor complex connected to the I/O bus, the processor complex including a memory device having a message queue structure; an I/O adapter connected to the I/O bus including a message processor processing messages received from said processor complex on the I/O bus that commands an I/O device connected to the I/O adapter to perform a function. Upon completion of the commanded function, the I/O adapter generates a second message and sends that message to the message queue structure. A signalling timer times an interval beginning with placing the second message in the message queue structure, and a message counter counts the number of messages in the message queue structure. Decision logic decides when to signal an interrupt to the processor complex.

To even further achieve the objects of the invention the decision logic updates the message count in the message counter when a message is enqueued, and signals an interrupt to the processor complex when the message count in the message counter exceeds a message pacing count. The decision logic also programs the signalling timer with a fast signal time value if the I/O device has a relatively short latency period or with a slow signal time value if the I/O device has a relatively long latency period. The signalling timer is started when the message is enqueued and signals an interrupt to the processor complex when the message count stored by the message counter exceeds the message pacing count or when the signalling timer has elapsed.

Furthermore, the invention can also be applied in a general fashion for generic first and second devices by providing an interrupt decision sequence, including the steps of sending a message from a first device to a second device; enqueing a message in a message queue located in the second device; updating a message count, and signalling an interrupt when the message count exceeds a message pacing count. The interrupt decision sequence may be refined by programming a response timer with a fast signal time value if the first device has a relatively short latency period or with a slow signal time value if the first device has a relatively long latency period. A signalling timer is started with the programmed time value and generates an interrupt when the message count exceeds the message pacing count or when the signalling timer has elapsed.

In the generalized interrupt sequence, the first device may be an I/O adapter having an I/O device connected thereto and the second device may be a processor complex connected to the I/O adapter via an I/O bus, wherein the message queue is a response message queue.

Alternatively, in the generalized interrupt sequence, the first device may be a processor complex connected to the I/O adapter via an I/O bus, the second device may be an I/O adapter having an I/O device connected thereto, wherein the message queue is a command message queue.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1A:
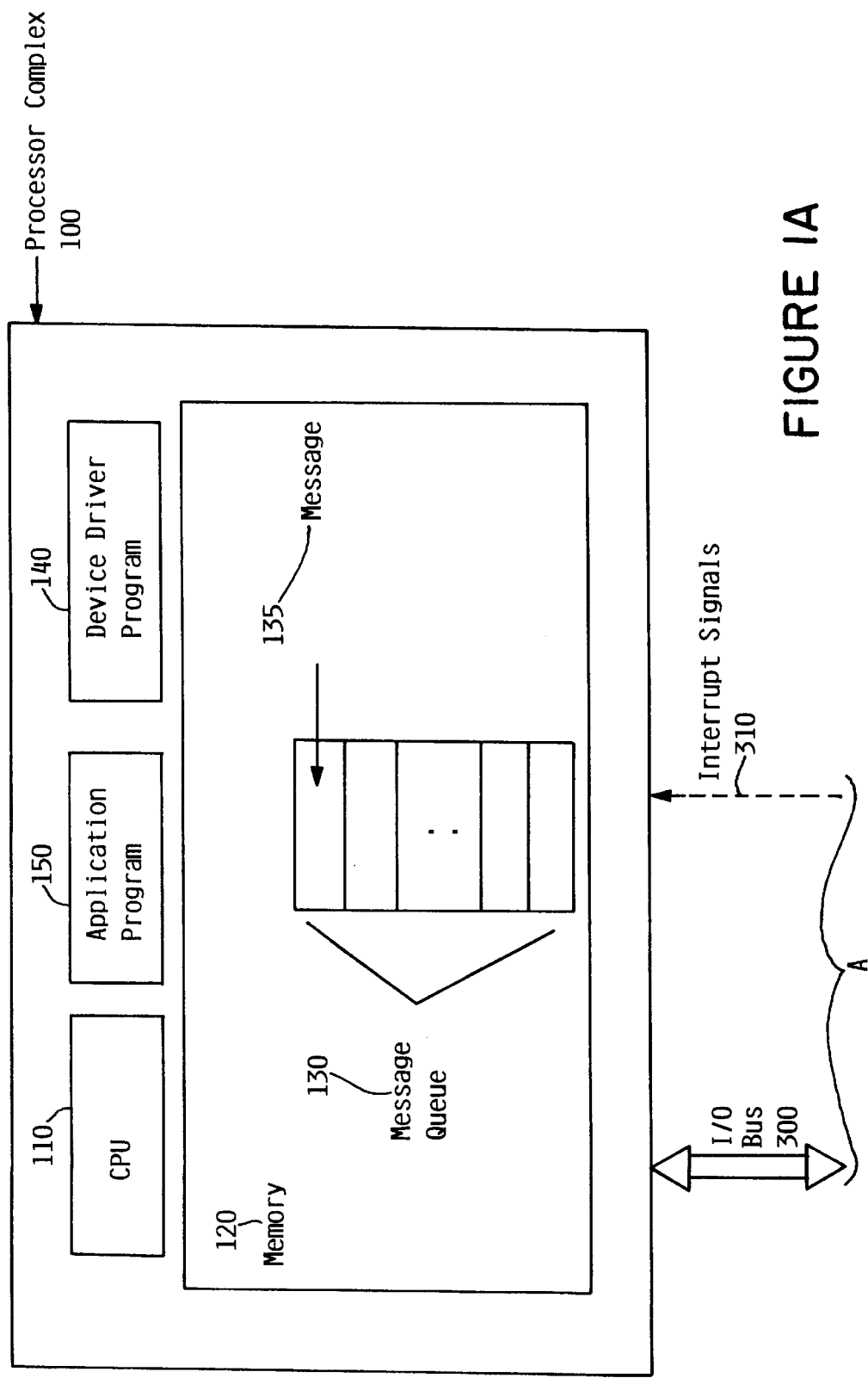
FIG. 1 is a high-level block diagram of an I/O queue management apparatus of the invention.
Figure 1B:
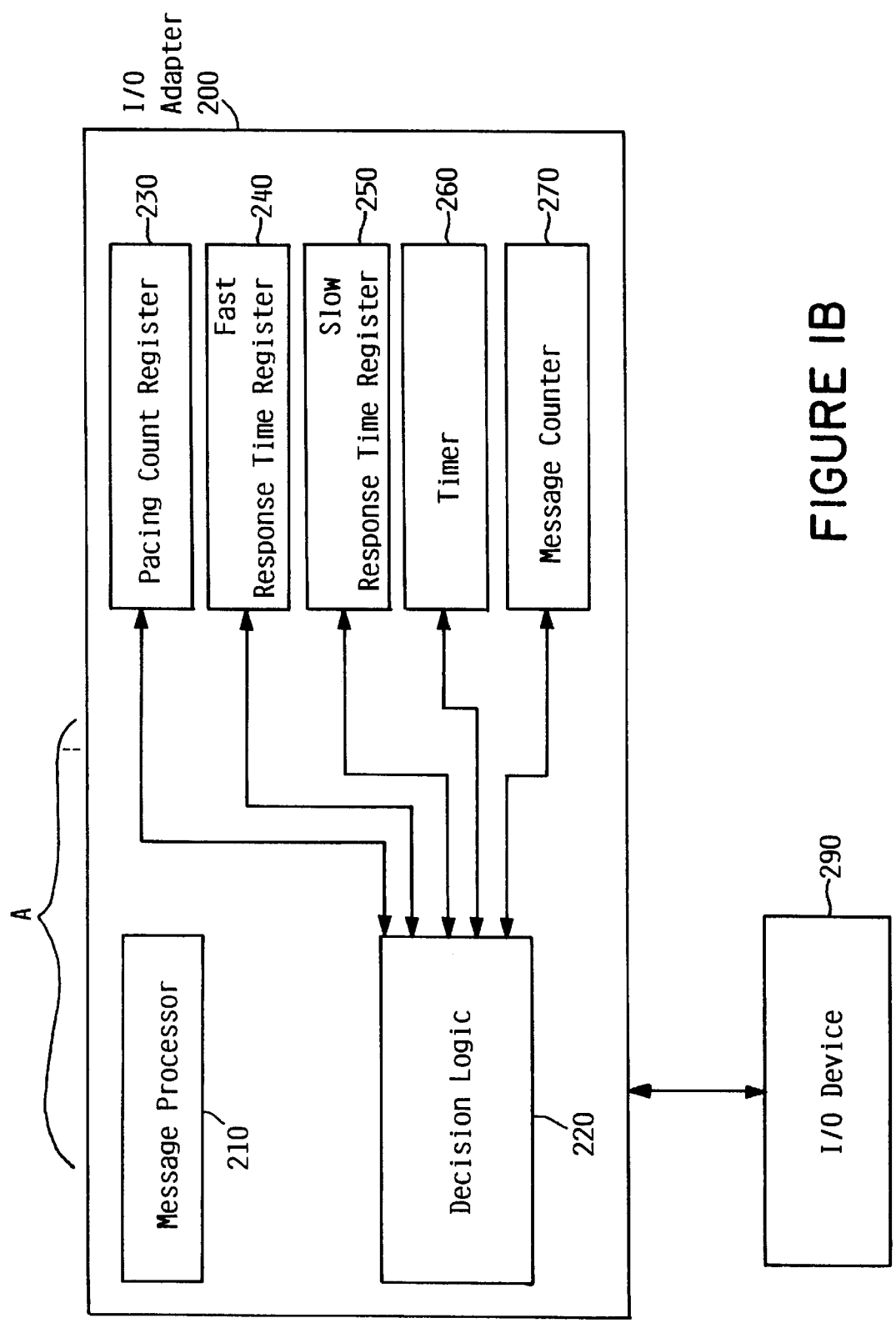

FIG. 1 illustrates a computer system including an I/O bus 300 interconnecting a processor complex 100 and an I/O adapter 200. An I/O device 290 is connected to the I/O adapter 200. In the preferred embodiment, the I/O bus 300 is a PCI Local Bus that conforms to the PCI Local Bus Specification and includes all of the PCI Local Bus specified signals between the processor complex 100 and I/O adapter 200. The interrupt signal 310 represents a subset of the I/O bus 300 and may be one or more of the PCI Local Bus Interrupt (A, B, C, or D) signals.

The processor complex 100 includes a central processing unit 110 and memory 120. During I/O processing, the central processing unit 110 executes a device driver 140 program or function that permits the processor complex 100 to communicate with the I/O adapter 200. After handling an I/O interrupt signaled by interrupt signal 310, the central processing unit 110 typically performs a context switch with, for example, an application program 150.

Apart from and in addition to standard I/O device and related control components, the I/O adapter 200 includes a message processor 210 and decision logic 220. The I/O adapter 200 also has several registers including a message pacing count register 230, a fast message time register 240, a slow message time register 250, a signalling timer 260, and a message counter 270 each of which are connected to decision logic 220 and message processor 210 directly or indirectly.

The invention is also applicable when the I/O adapter 200 receives commands from the computer system, in which case rather than response messages being accumulated in queues and counted, command messages are queued and counted. The invention is further applicable when messages are generated by the I/O adapter 200 independent of the commands from the processor complex 100, e.g., when an I/O device 290 changes state independent of a command.

Command Messages

The device driver 140 creates command messages and communicates these to the I/O adapter 200 via any variety of known mechanisms to communicate a protocol data unit across the I/O bus 300. In the preferred embodiment, the device driver 140 and I/O adapter 200 share a command message queue (not shown) within the memory 120, and mutually determine the location and size of this command message queue and the command messages stored therein. When the device driver 140 adds a command message to the command message queue, the device driver 140 signals the I/O adapter 200 that a command message is available. Also in the preferred embodiment, this command message queue is a circular queue and both the I/O adapter 200 and the device driver 140 have knowledge of the current location at which the other is operating upon the command message queue.

According to the memory write mechanisms prescribed within the PCI Local Bus Specification, other communications mechanisms within a preferred embodiment may include facilities within the I/O adapter 200, mapped to PCI memory space, that directly receive a command message as a target of a PCI memory write from the device driver 140 executing in the central processor 110, or that directly contain a response message as a target of a PCI memory read from the device driver 140.

I/O Device Processing of Command Message

The command message is interpreted by the message processor 210 which commands the I/O device 290 to perform the commanded I/O operation. For example, when an I/O device 290 responds to a "Read" command message by sending data to the processor complex 100, the I/O device 290 utilizes a DMA (Direct Memory Access) write into memory 120. DMA is a known technique for data transfer which does not utilize or otherwise burden the CPU 110 in the processor complex 100.

Message processor 210 receives message information from the processor complex 100 on a command message intended for the I/O adapter 200. The message information includes the command for the I/O device 290 and may include latency information about the response message. Upon completion of the command at the I/O device 290, the message processor 210 creates a response message which includes message information about the status of the command and latency information for decision logic 220 to program the signalling timer 260 and message counter 270. The message processor 210 may also generate a message conveying message information about the I/O adapter 200 and/or I/O device 290 independent of any command from the processor complex 210.

Response Message Queue 130

When the I/O device 290 completes the commanded I/O operation, then the processor complex 100 must be notified of this completion. More particularly, when I/O device 290 completes the commanded I/O operation, the message processor 210 then sends and enqueues a response message to the response message queue 130 via I/O bus 300.

In the preferred embodiment, the device driver 140 and I/O adapter 200 share a response message queue 130 within the processor complex 100 and mutually the number of messages on this queue 130. Also in the preferred embodiment, the response message queue 130 is a circular queue and both the I/O adapter 200 and the device driver 140 have knowledge of the current location at which the other is operating upon the queue. The response message queue 130 functions logically much like the command message queue in the sense that it is a circular queue of entries. The I/O adapter 200 and the processor complex 100 may both communicate their current positions in each of the queues as they move through the queues. The response message queue 130 could also be located in the I/O adapter 200, but this implementation is not preferred because of the latency associated with the processor complex 100 reading the response messages 135.

When the response message is enqueued, the I/O adapter 200 updates the response message counter 270 by incrementing or decrementing as preferred and the count refers to the number of response messages sent by I/O adapter 200 and is stored in the message counter 270. However, updating the response message counter 270 does not in and of itself notify the processor complex 100 that there is a message pending on the response message queue 130. This notification is performed by the interrupt signal 310 under several circumstances: when the response message count exceeds either a response message pacing count; or the maximum number of response messages capable of being stored in the response message queue; or when the response timer has elapsed, all to be discussed later.

Figure 3:
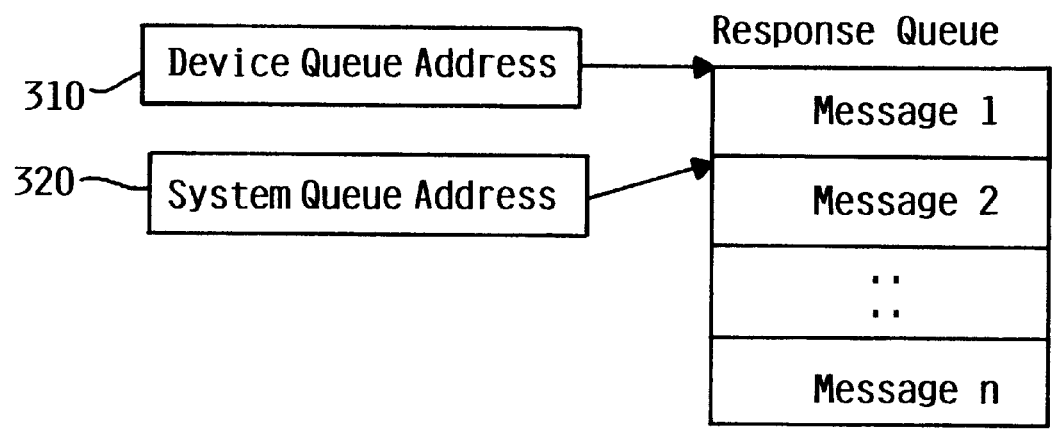
FIG. 3 is a block diagram showing an embodiment of the queue and queue addressing hardware.

Instead of using a response message counter 270, the current queue location in the response message queue 130 may alternatively be tracked, as shown in FIG. 3, with a device queue address pointer 310 pointing to a next queue entry location at which the I/O adapter will store the next response message and a system queue address pointer 320 pointing to a next queue entry location from which the system 100 will take and then process the next response message. The response message count can then be determined by finding the difference between the device and system queue address pointers 310, 320. The device and system queue address pointers 310, 320 are preferably stored in system memory 120 and have corresponding registers in the I/O adapter 200. Further details of such pointers are taught in the related application Ser. No. 08/950,593, incorporated by reference above. Briefly, the related application renames the response message queue 130 as an upstream queue and utilizes two pointers located in memory 120. More particularly, these pointers include an upstream queue device address and upstream queue system address each of which point to a message in the upstream queue and have corresponding registers in the I/O adapter 200 which can be used in place of the response message counter 270.

Following each response message processing, the system 100 advances its queue address and performs a write to the device queue system address register to indicate to the I/O adapter 200 that the system 100 has proceeded to that entry. This allows the I/O adapter 200 to compare its device queue address register and system queue address register value to know that it has additional space to put new messages into the response message queue 130. In other words, the response message count is the difference between the upstream queue system address and the upstream queue device address.

Interrupt Decision Sequence

To indicate to the processor complex 100 that there is available work on the response message queue 130, an interrupt signal 310 must be sent to the processor complex. When the I/O adapter 200 adds a response message to the queue 130 and determines that the inventive conditions are met to signal the device driver 140, the I/O adapter 200 signals the device driver 140 in the processor complex 100 with an interrupt across interrupt signal line 310.

Response Message Pacing Count

The response message pacing count is a mechanism by which the I/O adapter 200 can efficiently signal the processor complex 100 as to when the response message queue 130 needs servicing.

The response message count may be kept explicitly using a response message counter 270 or may be a difference between the system queue address and the device queue address on the response message queue 130. Essentially, when the response message count exceeds the response message pacing count, the I/O adapter 200 will interrupt the processor complex with an interrupt signal 310.

Fast and Slow Response Times

The I/O adapter decision logic 220 may also use the values of the response message pacing count register 230 and response message counter 270 in combination with the response message fast response time register 240, response message slow response time register 250 and response timer 260 to even more efficiently and effectively interrupt the processor complex 100. In short, these registers are utilized in combination to determine when the inventive conditions are met to signal the device driver 140 that one or more response messages 135 are available to process.

The fast and slow times play the role of pacing at what point the I/O adapter 200 interrupts the processor complex 100. For example, after the I/O adapter 200 stores a message on the response message queue 130 and starts the response timer 260 with either a fast or slow response time value, expiration of the response timer 260 will trigger the decision logic 220 to interrupt the processor complex 100 with an interrupt signal 310. In the interim, while the response timer 260 is running with, for example a slow response time value, then the I/O adapter 200 may actually store many response messages while the slow timer is running but never signal this interrupt until the slow latency timer elapses.

A practical example of this is a case in which the responses messages originate from a device that has normally high latency requirements. For example, an RS 232 interface is a communications interface that runs with relatively high latencies. In that case, in the course of 50 milliseconds, the RS 232 device may store multiple RS 232 messages on an response message queue 130, but because the processor complex 100 has a very fast central processor 110 in comparison, the processor complex 100 may need to only process messages received from an RS 232 interface once every 50 milliseconds or so.

In other words, the slow response time register 250 and response timer 260 form a mechanism which permits the processor complex 100 to accumulate multiple response messages from an I/O device(s) 290 in the response message queue 130 before being interrupted to process those messages. On the other hand, the fast response time register 240 and response timer 260 form a mechanism which limits the time that the I/O adapter 200 will wait before sending an interrupt 310 to the processor complex 100 when other response messages that are on the response message queue 130 have not created the conditions under which an interrupt should otherwise be sent.

It is also to be understood that separate registers 240, 250 need not be provided for the fast and slow response time values and that a single register may be utilized instead. If, on the other, hand, the I/O adapter 200 has multiple I/O devices 290 attached thereto and implements multiple protocols, both fast and slow response time registers 240, 250 may be needed. For example, an I/O adapter 200 that contains both fast and slow response time registers 240, 250 may incorporate both, for example, an RS 232 interface which does not require interrupts to be processed except at relatively long latencies, but at the same time may also implement a disk drive which might require very rapid responses to messages on the response message queue 130.

A single response timer 260 is utilized and is programmed by decision logic 220 such that when there is a fast event pending it will use the fast response time value to program the response timer 260 and will not allow a slow timer to be set. Also, when there are only slow response time events pending, then the decision logic 220 will use the slow response time value. Still further when a fast response time event occurs while the response timer 260 is running with a slow response time value, the decision logic 220 will reset the response timer 260 to run at the faster value.

Initializing

Prior to communicating command messages to the I/O adapter 200, the device driver 140 initializes the I/O adapter 200 by communicating the response message pacing count, response message fast response time and response message slow response time values to the I/O adapter 200 for storage in the associated registers. This initialization is shown by initialization step S1 in FIG. 2.

According to the memory write mechanisms prescribed within the PCI Local Bus Specification, the preferred embodiment may also include facilities within the I/O adapter 200, mapped to PCI memory space, that directly receive the response message pacing count, response message fast response time, and response message slow response time values as a target of a PCI memory write operations from the device driver 140 executing in the central processing unit 110.

Alternatively, the response message fast response time and slow response time may be explicitly or implicitly included in a command or response message. In the first alternative, these values are explicitly included as part of the message information by incorporating a fast or slow response time value explicitly within the message which is parsed by message processor and stored in register 240 or 250. In the second alternative, these values are implicitly included in the command or response message by utilizing a flag implicitly indicating fast or slow response time for the associated I/O device 290 being commanded.

Furthermore, this implicit indication may simply be the type of command message being sent which the message processor 210 can interpret to program the fast and slow response time registers 240, 250 and the response timer 260 with a value appropriate to the type of command issued. For example, a hard disc read command is a type of command which has a fast response time value while a remote communication command is the type of command which has a slow response time value. Thus, the message processor 210 can utilize the type of command to determine what the response time (fast or slow) should be and thereby store this value in register 240 or 250 and program response timer 260.

Queue Processing Sequence

The above generally describes the structure of the device and the functional roles of the response message pacing count register 230, response message fast response time register 240, response message slow response time register 250, response timer 260, response message counter 270, message processor 210 and decision logic 220.

Figure 2A:
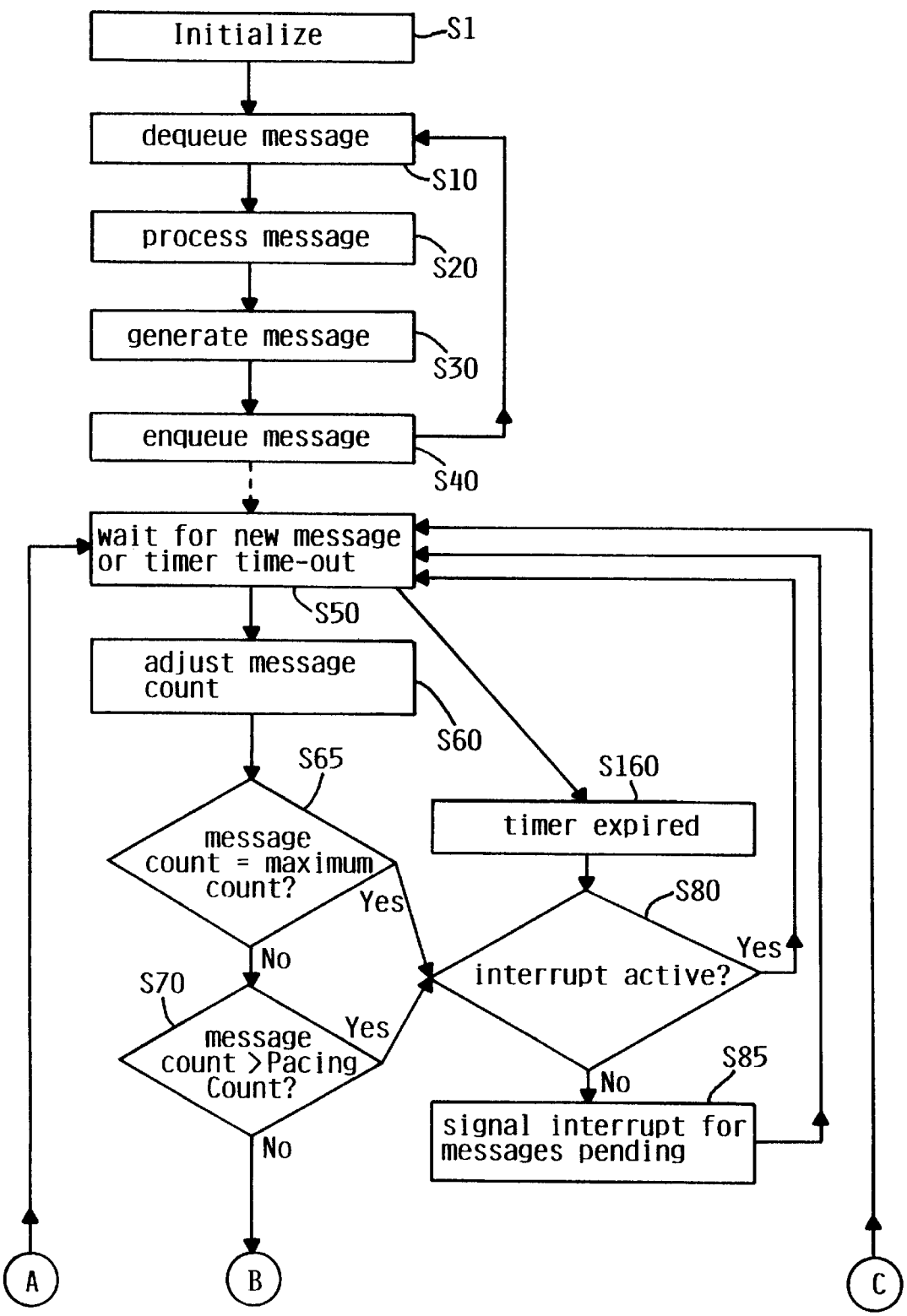
FIG. 2 is a high-level flowchart describing queue management and interrupt decision sequence according to the invention.
Figure 2B:
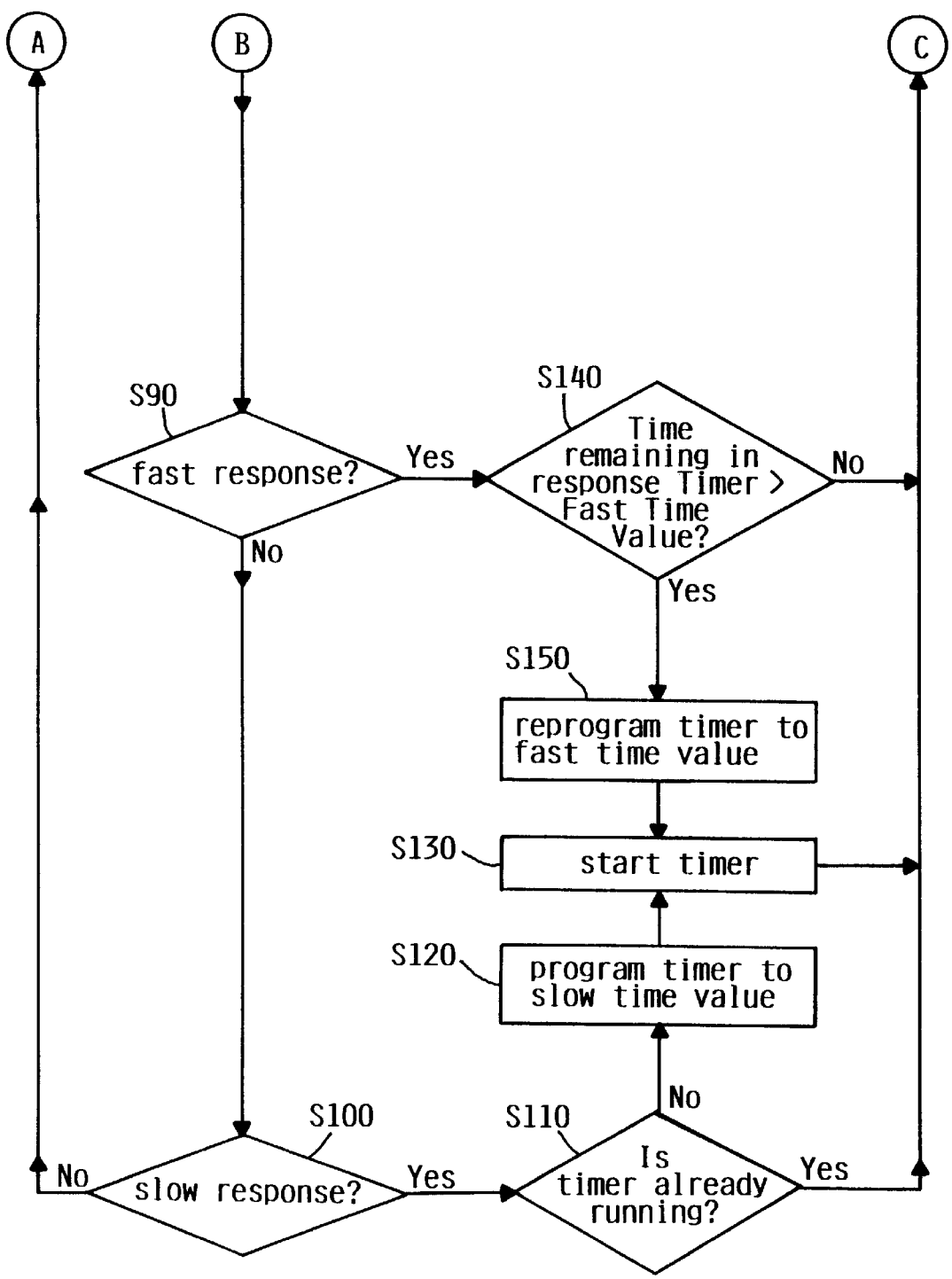

FIG. 2 illustrates a particular implementation of a queue processing sequence according to the invention which is generally performed by the decision logic 220 in association with the other elements of the I/O adapter 200 and processor complex 100. As shown in FIG. 2, the process may begin with optional initialization step S1 which is described above in the initializing section.

As further shown in FIG. 2, upon receiving from the device driver 140 the notification that a command message is available to process, the I/O adapter message processor 210 removes a command message from the command message queue (step S10), performs the operation requested by that command message (step S20), generates a response message (step S30), and places the response message on the response message queue (step S40).

More specifically, the dequeue command message and process command message steps (S10 and S20) correspond to the system having stored a command message on the command message queue and signaling the I/O adapter 200 by storing a pointer to the command message in the command message queue system address register, thereby indicating that the I/O adapter 200 has a command message on the command message queue to process.

The message processor 210 then dequeues that command in step S10 by performing a DMA read from the memory 120 and processes the command it has just received from the command message queue. Alternatively, steps S10 and S20 can be repeated prior to performing step S30 to dequeue and process a plurality of command messages before generating (S30) and enqueing (S40) response messages therefore. In other words, the I/O adapter 200 may batch process a plurality of command messages before generating and enqueing response messages. At the completion of the command processing in step S20 and when the I/O device 290 has done all the commanded work, the I/O adapter 200 will generate a response message (step S30) and then enqueue that response message on the response message queue in step S40.

As mentioned above, an interrupt signal 310 stimulates the processor complex 100 to process the response message queue 130. One of the inventive objects is to control when the interrupt signal 310 is sent.

The dashed line from enqueue response message step S40 downward to step S50 indicates a stimulus to the decision logic 220 to perform the interrupt decision sequence and thereby determine at what point to present the interrupt signal 310 to the processor complex 100. Thus, FIG. 2 contains two logically separate processes in steps S1–S40 and in steps S50–S160 and the dashed line represents that separation of function.

In other words, the decision logic 220 has an "idle" state in which it awaits a response message queuing event in step S50. Following the action of placing a response message on the response message queue 130 in step S40, the message processor 210 signals the decision logic 220 to initiate the interrupt decision sequence beginning with step S50.

When a new response message has been enqueued, the interrupt decision sequence is initiated in step S50. Then step S60 adjusts the response message counter 270 which records the number of response messages on the response message queue 130 that the device driver 140 has not yet removed from the queue.

Decision logic 220 may then perform optional step S65 which compares the response message count stored by response message counter 270 with a maximum number of response messages capable of being stored in the response message queue 130. Optional step S65 prevents the response message queue 130 from overflowing, but is not necessary to the interrupt decision sequence.

Step S70 then compares the response message count stored by response message counter 270 with the response message pacing count stored by the response message pacing count register 230. If the response message counter value exceeds the response message pacing count in step S70, and the interrupt signal is not already active (step S80), the I/O adapter 200 signals an interrupt to the central processor 110 via interrupt signal 310 (step S85) and resumes its status of awaiting another response message queuing event (step S50).

Alternatively, a command message may be of such a type as to require that its associated response message be signalled to the device driver 140 within a limited time of becoming available, independent of the number of other response messages presently available to the device driver, and independent of the desired interrupt cost amortization objectives of the computer system. Such commands, and their responses, may be of a nature that they have a very low latency requirement (a "fast" response), or that they have a higher latency requirement (a "slow" response). Responses to disk read or write command messages exemplify those that have a low latency, or fast, response requirement, and responses to some classes of communications line read or write command messages exemplify those that have a higher latency, or slow, response requirement.

As part of the message processor signal to the decision logic 220 that a response message has been enqueued, the message processor 210 indicates whether or not that response message requires a timed response and, if so, whether it is a fast or slow response time. If the number of response messages awaiting the device driver 140 does not itself cause an interrupt to be signaled in steps S70, S80 and S85, then the decision logic 220 determines if the response message has a fast response requirement and, if so, whether the response timer 260 is already active or not.

More specifically, step S90 determines if the response message requires a fast response from the processor complex 100. If not, then step S100 determines if the response message requires a slow response. If the message does not require a slow response, then the flow returns to step S50 to await for a new message or the lapse of response timer 260.

Steps S90 and S100 determine whether the response message requires a fast or slow response, respectively in one of several ways. As mentioned above, the fast and slow response values may be initialized in the I/O adapter 200 for each I/O device 290 as shown by initialization step S1 in FIG. 2. Alternatively, the response message fast response time and slow response time may be explicitly or implicitly included in a command message.

Thus, steps S90 and S100 use the initialized values or analyze the command message to determine whether the response message requires a fast or slow response.

If a slow response is required as determined by step S100, and the response timer 260 is not already active (step S110), the decision logic 220 programs the response timer 260 with the slow response time value and then starts the response timer in step S130.

Similarly, if the number of response messages awaiting the device driver 140 does not cause an interrupt to be signalled (step S70, S80 and S85), and the response message has a fast response time requirement in step S90, then the decision logic 220 determines if the remaining time in the response timer 260 is greater than the fast response time value in step S140. If so, then the response timer 260 is re-programmed with the fast response time value in step S150 and restarted in step S130. If not, then the flow returns to step S50 to await a new message or expiration the response timer 260.

Steps S140 and S150 come into play when (1) a message with a slow response time requirement is received first causing step S120 to program the response timer 260 with a slow response time value and (2) a message with a fast response time requirement is received shortly thereafter. In this case, the response timer 260 should be reprogrammed with the fast response time value if it is shorter than the remaining time left in the response timer 260.

Programming the response timer 260 in step S120 or reprogramming the response timer 260 in step S150 may be performed by utilizing the initialized fast and slow response values initialized for each I/O device 290 by initialization step S1, the value explicitly included in the command message or the indication implicitly included in the command message. In the third option, the timer programming steps S120 and S150 utilize the fast or slow response time indication in the command message to generate a fast or slow response time value and program the response timer 260 with the generated fast or slow response time value.

While the decision logic 220 is in the idle state (step S50), if the response timer 260 expires (step S160) and the interrupt is not already active (step S80), the decision logic 220 interrupts the processor complex 100 via interrupt signal 310 (step S85).

Generalized Message Queue

The invention has been described in terms of processing a response queue 130 in which the I/O adapter 200 enqueues a response message in the response message queue 130. It is to be understood, however, that this invention is applicably to a generalized message queue enqueing messages from a first device and storing them within a memory of a second device. More specifically, the invention may be generalized to including an interrupt decision sequence, including the steps of sending a message from a first device to a second device, enqueing a message in a message queue located in the second device, updating a message count counting a number of messages in the message queue, and signalling an interrupt when the message count exceeds a message pacing count.

The generalized interrupt decision sequence also benefits from the fast and slow response time values and their implementation as described above. More specifically, the generalized embodiment utilizes the decision logic 220 to program a response timer 260 with a fast response time value if the first device has a relatively short latency period or with a slow response time value if the first device has a relatively long latency period, to start the response timer 260 with the programmed response time value upon completion of the enqueing step, and to signal an interrupt 310 when the message count exceeds the message pacing count or when the response timer 260 has elapsed.

In the generalized embodiment, the first device may be an I/O adapter 200 having an I/O device 290 connected thereto and the second device may be a processor complex 100 connected to the I/O adapter 200 via I/O bus 300 wherein the message queue is a response message queue.

Alternatively, in the generalized embodiment, the second device may be an I/O adapter 200 having an I/O device 290 connected thereto and the first device may be processor complex 100 connected to the I/O adapter 200 via I/O bus 300 wherein the message queue is a command message queue.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for handling I/O messages transmitted over an I/O bus, comprising:
   a processor complex connected to the I/O bus, said processor complex including a memory device having a message queue structure;
   an I/O adapter connected to the I/O bus, said I/O adapter including
   a message processor to process messages, to generate messages, and to send messages to the message queue structure;
   a signalling timer timing an interval beginning with placing a message in the message queue structure; and
   decision logic deciding when to signal an interrupt to said processor complex;
   said decision logic programs the signalling timer with a fast signal time value if the message has a relatively short latency period or with a slow signal time value if the message has a relatively long latency period, and
   the decision logic starts the signalling timer when the message is enqueued, and
   said decision logic signalling an interrupt to said processor complex when the signalling timer has elapsed.

2. The system of claim 1, wherein
   a message counter counting a number of messages in the message queue structure;
   said decision logic updating a message count in said message counter when the message is enqueued, and
   the decision logic signals an interrupt to the processor complex when the message count stored by the message counter exceeds the message pacing count or when the signalling timer has elapsed.

3. The system of claim 2, wherein the message is a response message from the I/O adapter to the processor complex and the message queue structure is a response message queue structure and the message count is a response message count and the message counter is a response message counter and the message pacing count is a response message pacing count.

4. The system of claim 2, wherein the message is a command message from the processor complex to the I/O adapter to command an I/O device connected to the I/O adapter to perform a function and the message queue structure is a command message queue structure and the message count is a command message count and the message counter is a command message counter and the message pacing count is a command message pacing count.

5. The system of claim 2, wherein the message pacing count is a number less than a maximum number of messages capable of being stored in the message queue structure.

6. The system of claim 2, wherein
   the decision logic compares the message count stored by the message counter against a maximum number of messages capable of being stored in the message queue structure,
   the decision logic signals an interrupt to the processor complex when the message count stored by the message counter exceeds either the message pacing count or the maximum number of messages capable of being stored in the message queue structure or when the signalling timer has elapsed.

7. The system of claim 2, wherein
   the processor complex initializes the I/O device with either the fast or slow signal time value, and
   the decision logic utilizes the fast or slow signal time value to program the signalling timer with the fast or slow signal time value.

8. The system of claim 2, wherein
   the processor complex implicitly includes either a fast or slow signal time value in the message based on message information contained in the message, and
   the decision logic utilizes the fast or slow signal time value to program the signalling timer.

9. The system of claim 2, wherein
   the processor complex explicitly includes either a fast or slow signal time value in the message, and
   the decision logic utilizes the fast or slow signal time value in the message to program the signalling timer.

10. The system of claim 2, wherein the decision logic signals an interrupt signal to the processor complex if an interrupt signal is not already active.

11. The system of claim 2, wherein the decision logic programs the signalling timer with the slow signal time value if the signalling timer is not already running.

12. The system of claim 2, wherein the decision logic programs the signalling timer with the fast signal time value if a remaining time in the signalling timer exceeds the fast response time value.

13. The system of claim 2, wherein the first message counter includes:
    a first pointer pointing to the last message enqueued by the message processor in the message queue structure,
    a second pointer pointing to the next message in the message queue structure to be processed by the processor complex, and
    the processor complex updates the second pointer when a message has been processed by the processor complex, and
    the message processor updates the first pointer upon enqueing message in the message queue structure,
    wherein the message count is the difference between the first and second pointers.

14. In a computer system having a first and second device interconnected by a bus, an interrupt decision sequence, comprising:
    sending a message from the first device to the second device, enqueing a message in a message queue located in the second device, programming a signalling timer with a fast signal time value if the first device has a relatively short latency period or with a slow signal time value if the first device has a relatively long latency period, starting the signalling timer with the programmed response time value after completion of said enqueing step, and signalling an interrupt to the second device when the the signalling timer has elapsed.

15. The interrupt decision sequence of claim 14, further comprising:

updating a message count counting a number of messages in the message queue after completion of said enqueing step, and said signalling step signalling an interrupt when the message count exceeds the message pacing count or when the signaling timer has elapsed.

16. The interrupt decision sequence of claim 15, further comprising:

comparing the message count against a maximum number of messages capable of being stored in the message queue, said signalling step signalling an interrupt when the message count exceeds the message pacing count or the maximum number of first messages capable of being stored in the message queue or when the signalling timer has elapsed.

17. The interrupt decision sequence of claim 15, said sending a message step including:

implicitly including a fast or slow signal time value in the message, said programming step utilizing the fast or slow signal time value in the first message to program the signalling timer.

18. The interrupt decision sequence of claim 15, said sending a message step including:

explicitly including a fast or slow signal time value in the message, said programming step utilizing the fast or slow signal time value in the first message to program the signalling timer.

19. The interrupt decision sequence of claim 15, further comprising:

initializing the first device with either a fast or slow signal time value, said programming step utilizing the fast or slow signal time value to program the signalling timer.

20. The interrupt decision sequence of claim 14, further comprising:

addressing the message queue with a first and second pointer wherein the first pointer points to the last message enqueued by said enqueing step and the second pointer points to a next message in the message queue to be processed by the second device, updating the second pointer when the second device processes a message in the message queue, updating the first pointer upon enqueing message in said enqueing step, and said updating a message count step including the substep of calculating the message count by finding the difference between the first and second pointers.

21. The interrupt decision sequence of claim 15, said programming step programming the signalling timer with the slow signal time value if the signalling timer is not already running.

22. The interrupt decision sequence of claim 15, said programming step programming the signalling timer with the fast signal time value if a remaining time in the signalling timer exceeds the fast signal time value.

23. The interrupt decision sequence of claim 14, wherein the message pacing count is a number less than a maximum number of messages capable of being stored in the message queue.

24. The interrupt decision sequence of claim 14, said signalling step signalling an interrupt if an interrupt is not already active.

25. The interrupt decision sequence of claim 14, wherein the first device is an I/O adapter having an I/O device connected thereto, wherein the second device is a processor complex connected to the I/O adapter via an I/O bus, wherein the message is from the I/O adapter to the processor complex and the queue is a response message queue.

26. The interrupt decision sequence of claim 14, wherein the second device is an I/O adapter having an I/O device connected thereto, wherein the first device is a processor complex connected to the I/O adapter via an I/O bus, and wherein the message is from the processor complex to the I/O adapter and queue is a command message queue.

27. A method of managing a first message queue in a computer system:

providing the first message queue in a memory of the computer system, generating a first message, enqueing the first message in the first message queue of the memory, programming a signalling timer with a fast signal time value if the first message has a relatively short latency period or with a slow signal time value if the first message has a relatively long latency period in response to said enqueing step enqueing the first message, and signalling a processor complex interrupt when the signalling timer has elapsed.

28. The method of claim 27, said signalling step signalling a processor interrupt signal if a processor interrupt is not already active.

29. The method of claim 27, further comprising:

updating a first message count, and said signalling step signalling a processor complex interrupt when the first message count exceeds the first message pacing count or when the signalling timer has elapsed.

30. The method of claim 29, further comprising:

sending a second message, wherein the first message is from an I/O adapter to a processor complex and the second message is from the processor complex to the I/O adapter on an I/O bus commanding an I/O device connected to the I/O adapter to perform a function and the first message queue is a response message queue and the first message count is a response message count and the first message pacing count is a response message pacing count.

31. The method of claim 29 further comprising:

sending a second message, wherein the first message is from a processor complex to an I/O adapter and the second message is from the I/O adapter to the processor complex and the first message queue is a command message queue and the first message count is a command message count and the first message pacing count is a command message pacing count.

32. The method of claim 29, wherein a first response message pacing count is a number less than a maximum number of first messages capable of being stored in the first message queue.

33. The method of claim 29, further comprising:

comparing the first message count against a maximum number of first messages capable of being stored in the first message queue, said signalling step signalling a processor complex interrupt when the first message count exceeds either the first message pacing count or the maximum number of first messages capable of being stored in the first message queue or when the signalling timer has elapsed.

34. The method of claim 29, further comprising:

initializing an I/O adapter with either a fast or slow signal time value, said programming step utilizing the fast or slow first signal value to program the signalling timer.

35. The method of claim 27, said step of sending a second message implicitly includes either a fast or slow signal time value in the second message based on message information in the second message, and said programming step utilizes the fast or slow signal time value to and program the signalling timer.

36. The method of claim 29, said sending a second message step explicitly including either a fast or slow signal time value in the second message, and said programming step utilizing the fast or slow signal time value in the second message to program the signalling timer.

37. The method of claim 29, said programming step programming the signalling timer with the slow signal time value if the signalling timer is not already running.

38. The method of claim 29, said programming step programming the signalling timer with the fast signal time value if a remaining time in the signalling timer exceeds the fast signal time value.

39. The method of claim 29, further comprising:

addressing the first message queue with a first and second pointer wherein the first pointer points to a next first message in the response queue to be processed by the processor complex and the second pointer points to the last first message enqueued by said enqueing step updating the first pointer when the processor complex processes a first message in the first message queue, updating the second pointer upon enqueing a first message in said enqueing step, and said updating a first message count step including the substep of calculating the first message count by finding the difference between the first and second pointers.

* * * * *